United States Patent
Archetti et al.

(10) Patent No.: US 6,904,871 B1
(45) Date of Patent: Jun. 14, 2005

(54) ANIMAL TETHERING DEVICE

(75) Inventors: James A. Archetti, 854 Broadway, Haverhill, MA (US) 01832; Dennis La Roche, Hampstead, NH (US); Kevin O'Connor, Sandown, NH (US)

(73) Assignee: James A. Archetti, Haverhill, MA (US)

( * ) Notice: Subject to any disclaimer, the term of this patent is extended or adjusted under 35 U.S.C. 154(b) by 0 days.

(21) Appl. No.: 10/900,790

(22) Filed: Jul. 28, 2004

(51) Int. Cl.[7] ................................................ A01K 1/04
(52) U.S. Cl. ........................ 119/786; 119/787; 119/789
(58) Field of Search ................................. 119/786, 787, 119/788, 789, 790, 794, 796

(56) References Cited

U.S. PATENT DOCUMENTS

| | | | | |
|---|---|---|---|---|
| 167,263 | A | * 8/1875 | Maguire | 119/789 |
| 429,123 | A | * 6/1890 | Farish | 119/789 |
| 2,437,786 | A | * 3/1948 | Oberdorf et al. | 242/382.4 |
| 2,551,540 | A | * 5/1951 | Johnson | 119/786 |
| 2,941,504 | A | * 6/1960 | Supowitz | 119/786 |
| 3,123,052 | A | * 3/1964 | Marshall | 119/789 |
| 3,921,589 | A | * 11/1975 | Mcgahee | 119/786 |
| 4,620,506 | A | * 11/1986 | Stubbs | 119/780 |
| 4,796,566 | A | * 1/1989 | Daniels | 119/789 |
| 4,800,843 | A | 1/1989 | Wendling | |
| 5,022,351 | A | * 6/1991 | Daniels | 119/789 |
| 5,161,487 | A | 11/1992 | Miller | |
| 5,732,659 | A | * 3/1998 | Wiggins | 119/787 |
| 5,957,092 | A | 9/1999 | Colsch | |
| 6,314,916 | B1 | * 11/2001 | Watson, Sr. | 119/788 |
| 6,318,302 | B1 | 11/2001 | Bedient | |
| 6,523,500 | B1 | 2/2003 | Zenteno | |
| 6,526,918 | B1 | 3/2003 | Arnold | |
| 6,612,263 | B2 | 9/2003 | Scheid et al. | |

* cited by examiner

Primary Examiner—Yvonne R. Abbott
(74) Attorney, Agent, or Firm—Patrick D. Archibald

(57) ABSTRACT

Provided is an animal tethering device for confining an animal to a location and allowing it to move freely within a prescribed area, while preventing entanglement. The device includes a central shaft through which a spool is rotatably and retractably attached. The device also includes a housing which may resemble a sports ball or other desired ornamental design. The device provides optimum rotation by allowing forces in the horizontal plane, and also offers maximum strength in the entire spool assembly.

18 Claims, 4 Drawing Sheets

ANIMAL TETHERING DEVICE

BACKGROUND OF THE INVENTION

1. Field of the Invention

This invention relates generally to the field of animal husbandry and more particularly to a retractable, rotating animal tether.

2. Description of the Related Art

When animals, and in particular dogs, need to be brought outside there are only a few options for the average owner. The animal may be set loose to roam as it desires, which unless the owner has a confined yard is a violation of local law in most places. The owner may choose to enjoy the exercise of walking along with the animal, employing a handheld leash of some sort. However, this option is not always desirable, nor practical. Some owners also utilize some variety of tethering device that is made fast to a post or inserted directly into the ground.

Examples of such tethers include the patents granted to Wendling, U.S. Pat. No. 4,800,843 and Miller, U.S. Pat. No. 5,161,487. Each of these patents disclose devices that include a tether attached in some manner to a spike that may be driven into the ground. However, this style of tether lends itself to tangling as although they are rotatable, neither offers retraction of the tether, which is a highly successful means of preventing entanglement of the animal. Therefore, what is required is some means of also retracting the tether.

Other prior art devices have attempted to solve this problem by adding retractability to the device. Examples include the patents granted to Bedient, U.S. Pat. No. 6,318,302, Zenteno, U.S. Pat. No. 6,523,500, and Scheid et al., U.S. Pat. No. 6,622,263. The common weakness in all of these patents is that all of the devices are oriented in a vertical plane. The patent granted to Scheid et al., primarily resembles a typical handheld retractable leash that is clipped onto the top of a pole. The tether disclosed by Bedient also includes a pole with a portion similar to a handheld retractable leash, with the addition of an eyelet to assist with rotation. The patent granted to Zenteno includes retractability and rotation with the added feature of a tether brake. One reason for desiring a non-vertical orientation of the device is that a vertical orientation is not as strong as one that is horizontally mounted with a central shaft. For example, in Zenteno, the tether portion of the device is attached vertically to a stake. It is this attachment area that will likely fail first on the device.

Additionally, vertical orientation does not naturally lend itself to rotative forces. When an animal presents a force on the vertically oriented tether, the force comes at a downward angle relative to the device. When the animal moves laterally, the tethering member must then provide an indirect force to the device to enable the rotation means. These inefficient forces result in uneven wear, improper rotation, and even entanglement in certain situations.

None of these prior art devices solve the problems of entanglement along with providing the strength necessary to properly and safely tether an animal. There is also no practical way to combine patents such as those granted to Wendling or Miller with that of Zenteno. Any attempt to do so would result in an inoperable device, and one that still lacks many important features necessary to overcome the problems currently presented.

What is required is an animal tethering device that provides retractability and rotation. What is also required is an animal tethering device that prevents entanglement.

What is further required is an animal tethering device that can overcome the inherent weaknesses a vertically oriented tethering device.

What is also required is an animal tethering device wherein the anchoring shaft passes completely through a central area of the spool portion of the device.

It is also desired that the tethering device employ forces in the horizontal plane so as to take advantage of the most efficient means for rotation of the device.

BRIEF SUMMARY OF THE INVENTION

Accordingly, it is an object of the present invention to provide a means for tethering an animal that allows for rotation and retractability.

It is also an object of the present invention to provide a means for preventing entanglement of an animal utilizing the tethering device of the present invention.

It is also an object of the present invention to provide a tethering device wherein the anchoring portion of the device passes completely through and beyond the spool portion of the device.

It is a further object of the invention to provide a means of providing a non-vertical orientation so as to best harness the forces put upon the device by a tethered animal.

BRIEF DESCRIPTION OF THE SEVERAL VIEWS OF THE DRAWINGS

These and other features, aspects and advantages of the present invention will become better understood with reference to the following description, appended claims, and accompanying drawings where:

DETAILED DESCRIPTION OF THE INVENTION

Figure 1:
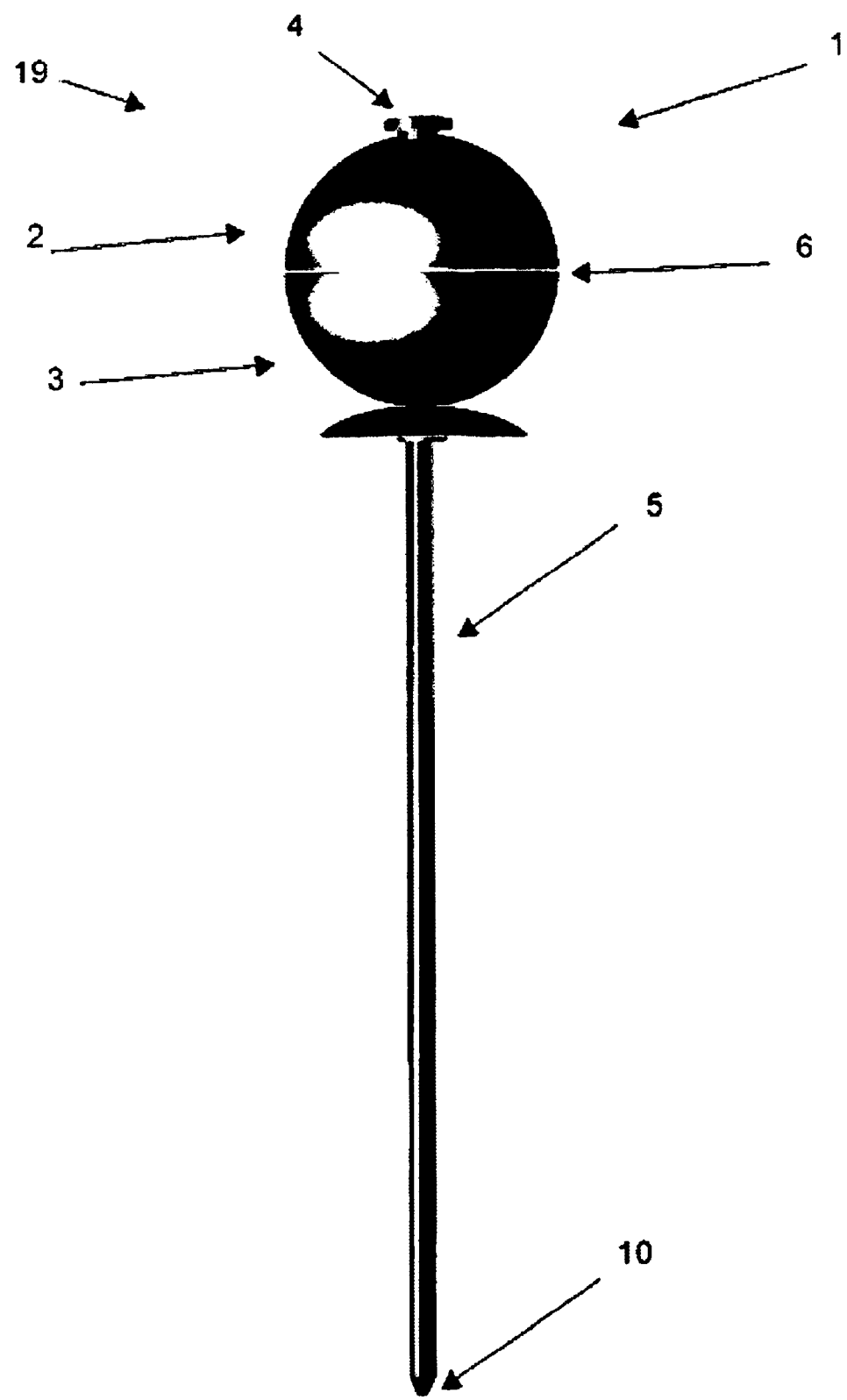
FIG. 1 is a perspective view of the tethering device of the present invention.

FIG. 1 illustrates a perspective view of tethering device 1 displaying shaft 5 through which upper housing portion 2 and lower housing portion 3 reside. Top knob 4 is displayed providing a securing means for upper housing portion 2 and lower housing portion 3 of housing 19, in addition to providing a striking surface 9 for driving shaft 5 into the ground via insertion end 10. Tether payout region 6 is displayed between upper housing portion 2 and lower housing portion 3.

Figure 2:
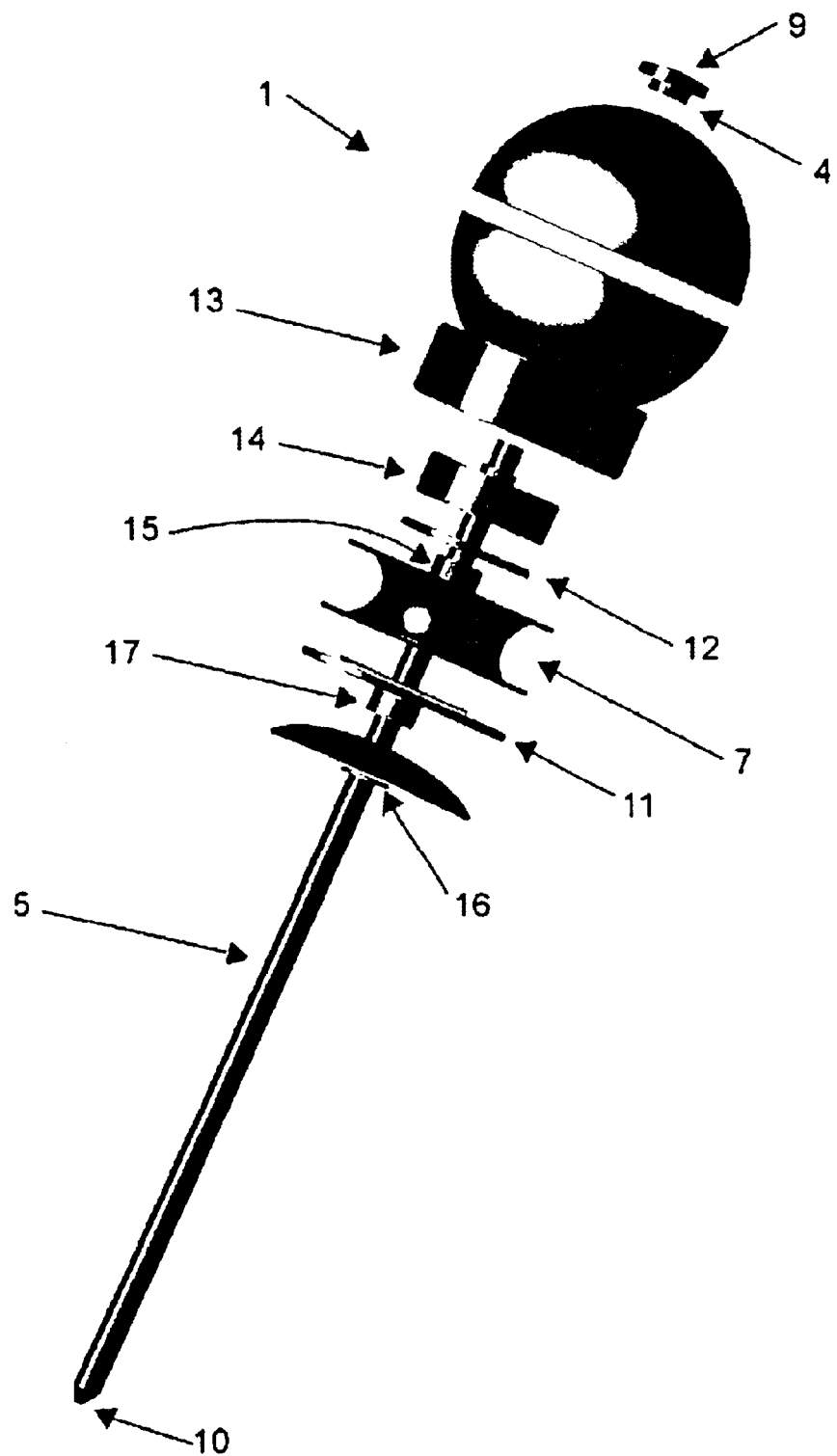
FIG. 2 is an exploded view of the preferred embodiment of the tethering device of the present invention.

FIG. 2 illustrates an exploded view of the preferred embodiment of tethering device 1. The spool 7 includes a center bottom 11, center cap 12, and center top 13. Spring 14 provides the means for retracting spool 7, and includes retainer 15. A lower shaft collar 16 and upper shaft collar 17 provide the necessary spacing of the various components, and shaft sleeve 18 provides for smooth rotation in the preferred embodiment. The shaft sleeve 18 is noted as a separate element in FIG. 2, but it will: be apparent to those skilled in the art that the spool itself could easily rotate directly about shaft 5. Additionally, components such as upper shaft collar 17 and lower shaft collar 16 are included in the preferred embodiment to provide the optimum configuration of tethering device 1, and are not meant as limitations. Further, spring 14 could be replaced by any suitable article capable of providing the necessary retractive force, that is, when tension is released, sufficient slack will be taken up by the retraction means in order: to prevent tangling.

Figure 3:
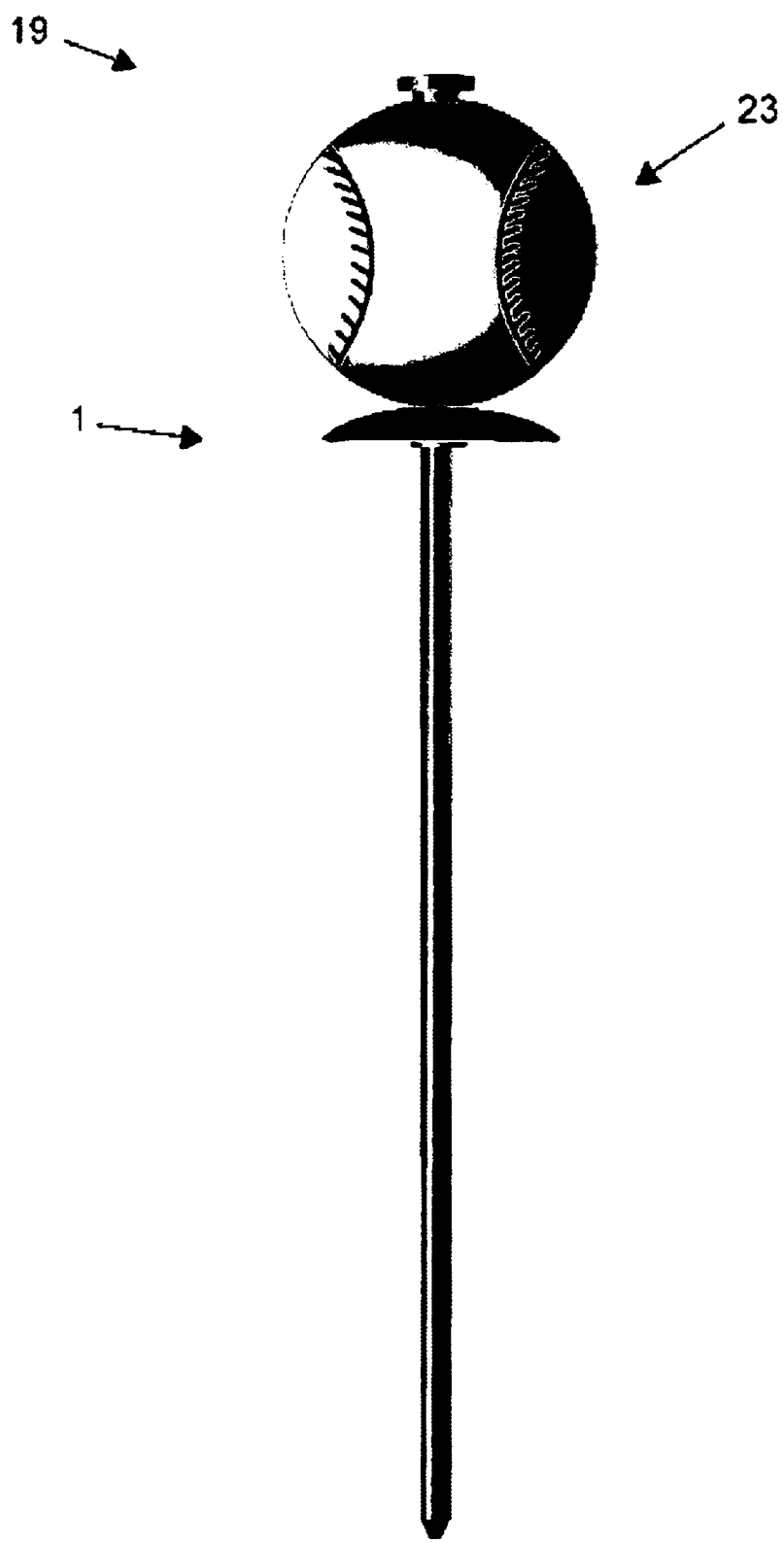
FIG. 3 is a perspective view of an embodiment of the tethering device of the present invention illustrating a sports ball housing.

FIG. 3 is a perspective view of tethering device 1 illustrating an alternative embodiment wherein housing 19 is designed to resemble as a sports ball 23. Other varieties of sports balls and equipment, such as basketballs, footballs, tennis balls, and soccer balls could also be used. Further, the housing can be formed to any desired shape or design provided it adequately houses the internal components of tethering device 1.

The housing can be made of various materials designed to repel the weather, or invite chewing by the animal through the use of material or scent or flavor. The housing 19 could be entirely left off the device, but this is not desirable as the components would thereby be completely exposed and increase the risk of malfunction.

Figure 4:
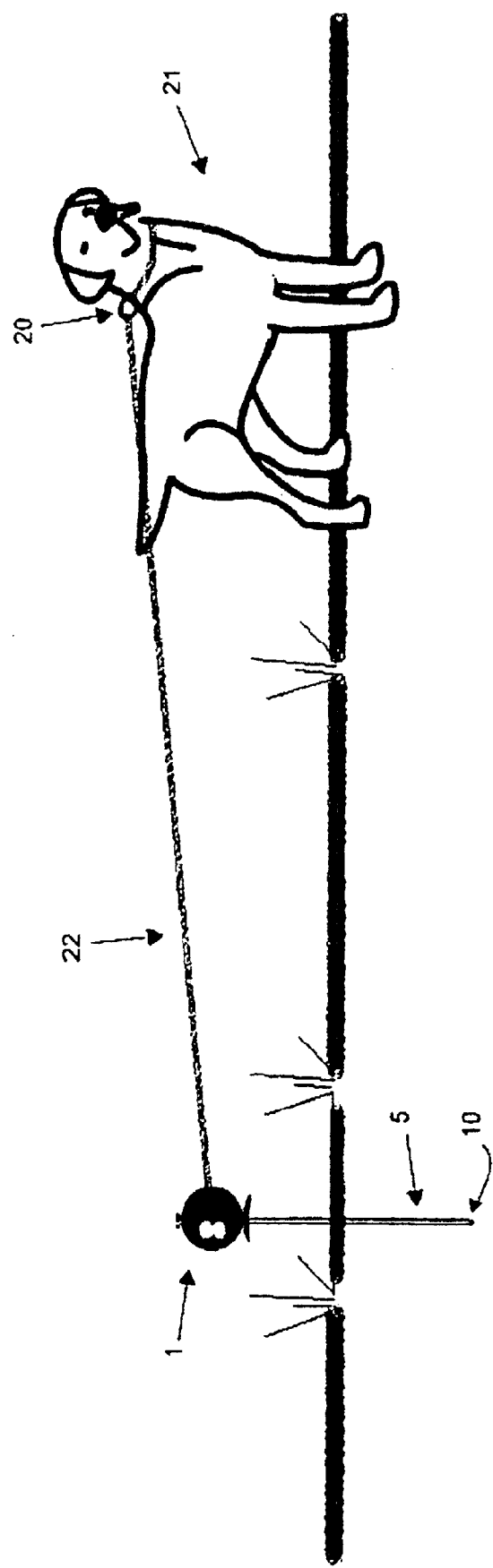
FIG. 4 is a perspective view of the tethering device of the present invention displaying a tethered animal.

FIG. 4 is a perspective view of tethering device 1 wherein shaft 5 has been inserted into the ground, and tethering member 22 is seen, along with animal attachment means 20 attached to a collar worn by animal 21. Insertion end 10 of shaft 5 can also include alternate embodiments without departing from the scope and spirit of the invention. For example, shaft 5 may be in the form of a screw, include various diameters, or multiple insertion points or other anchor components such as barbs or similar additions.

Additionally, the present invention may be constructed of a variety of materials. Metals and/or plastic may be used, and attachment means may include screws, rivets, welds, or snap-on components as is typical in the art. Also, the shaft 5 may be of varying lengths, so long as a firm anchor is obtained. Additionally, shaft 5 may pass through spool 7 and extend beyond it in varying amounts.

Although the present invention has been described with reference to particular embodiments, it will be apparent to those skilled in the art that variations and modifications can be substituted therefore without departing from the principles and spirit of the invention.

What is claimed is:

1. A tethering device comprising:
    a tethering member;
    a spool, capable of retaining said tethering member; and
    a shaft, said shaft passing substantially through a central portion of said spool.

2. The tethering device of claim 1 further comprising a housing, wherein said housing substantially houses said spool.

3. The tethering device of claim 1, wherein said spool further comprises a means for rotating about said shaft.

4. The tethering device of claim 3, wherein said spool further comprises a means for retracting said tethering member.

5. The tethering device of claim 4 further comprising a housing, wherein said housing substantially houses said spool.

6. The tethering device of claim 5 wherein said housing includes portions defining a tether payout region.

7. The tethering device of claim 6, wherein said housing further comprises a top housing portion and said housing further comprises a bottom housing portion.

8. The tethering device of claim 7, wherein the combination of said top housing portion and said bottom housing portion define said tether payout region.

9. The tethering device of claim 8, further comprising a top knob, wherein said top knob is capable of securing said housing to said shaft.

10. The tethering device of claim 9, wherein said top knob further comprises a striking surface.

11. The tethering device of claim 10, wherein said means for rotating comprise a shaft sleeve.

12. The tethering device of claim 11, wherein said tethering member includes an animal attachment end.

13. The tethering device of claim 12, wherein said means for retracting comprises a spring, wherein said spring is attached to said spool.

14. The tethering device of claim 13, wherein said housing is substantially spherical.

15. The tethering device of claim 14, wherein said housing substantially resembles a sports ball.

16. The tethering device of claim 15, wherein said tethering member comprises a length, wherein said length is between five and twenty feet.

17. The tethering device of claim 16, wherein said shaft includes an insertion end.

18. A tethering device comprising:
    a tethering member;
        a spool, capable of retaining said tethering member, and wherein said spool further comprises a means for rotating said tethering member, and wherein said spool comprises a means for retracting said tethering member;
    a shaft, said shaft passing substantially through a central portion of said spool;
    a housing, wherein said housing substantially houses said spool.

* * * * *